United States Patent
Song et al.

(10) Patent No.: US 12,320,921 B2
(45) Date of Patent: Jun. 3, 2025

(54) METHODS FOR PHASED ARRAY CALIBRATION BASED ON CNN-LSTM USING POWER MEASUREMENT

(71) Applicant: DONGHAI LABORATORY, Zhejiang (CN)

(72) Inventors: Chunyi Song, Zhoushan (CN); Xinhong Xie, Zhoushan (CN); Zixian Ma, Zhoushan (CN); Haotian Chen, Zhoushan (CN); Nayu Li, Zhoushan (CN); Haohong Xu, Zhoushan (CN); Bing Lan, Zhoushan (CN); Zhiwei Xu, Zhoushan (CN)

(73) Assignee: DONGHAI LABORATORY, Zhoushan (CN)

( * ) Notice: Subject to any disclaimer, the term of this patent is extended or adjusted under 35 U.S.C. 154(b) by 0 days.

(21) Appl. No.: 18/976,291

(22) Filed: Dec. 10, 2024

(65) Prior Publication Data
US 2025/0102623 A1    Mar. 27, 2025

(30) Foreign Application Priority Data
Feb. 20, 2024   (CN) .......................... 202410188836.2

(51) Int. Cl.
*G01S 7/40*       (2006.01)
*G01S 13/02*      (2006.01)
(Continued)

(52) U.S. Cl.
CPC ................ *G01S 7/40* (2013.01); *G01S 13/02* (2013.01); *G06N 3/0442* (2023.01);
(Continued)

(58) Field of Classification Search
CPC ..................................................... H01Q 3/267
See application file for complete search history.

(56) References Cited

U.S. PATENT DOCUMENTS

| | | | |
|---|---|---|---|
| 11,115,136 B1 * | 9/2021 | Kim | ........................ H01Q 3/267 |
| 2020/0358177 A1 | 11/2020 | Ge et al. | |
| 2024/0063537 A1 * | 2/2024 | Liu | ........................ H01Q 3/267 |

FOREIGN PATENT DOCUMENTS

| CN | 109952513 A | 6/2019 |
|---|---|---|
| CN | 112881972 A | 6/2021 |
| CN | 117196577 A | 12/2023 |

OTHER PUBLICATIONS

Z. Sarayloo, N. Masoumi, H. Shahi, E. H. Mirza Alian, S. S. Naeini and M. N. Ahmadabadi, "A Convolutional Neural Network Approach for Phased Array Calibration Using Power-Only Measurements," 2020 28th Iranian Conference on Electrical Engineering (ICEE), Tabriz, Iran, 2020, pp. 1-6. (Year: 2020).*

(Continued)

*Primary Examiner* — Bernarr E Gregory
(74) *Attorney, Agent, or Firm* — Porus IP LLC

(57) ABSTRACT

Embodiments of the present disclosure provide a method for phased array calibration based on CNN-LSTM using power measurement, comprising: establishing a phased array calibration signal model, and utilizing a program to conveniently obtain a large amount of data for training a neural network without the need for actual measurements; converting and preprocessing the generated data, and saving as a training dataset in the form of feature data and labels; establishing a CNN-LSTM network, and inputting the training data with labels into the CNN-LSTM network for training until the CNN-LSTM network converges to obtain the final calibration model; measuring the phased array to be measured to obtain feature data, obtaining a calibration result of the phased array by inputting the feature data into the calibration model obtained from the training. The method is designed to solve problems of low calibration accuracy, low measurement efficiency, and high instrumentation requirements of the existing phased array calibration (Continued)

processes, and the proposed calibration method has a very high calibration efficiency, and the number of measurements required is much lower than that of all current power measurement-based calibration methods.

8 Claims, 6 Drawing Sheets

(51) Int. Cl.
    *G06N 3/0442*     (2023.01)
    *G06N 3/0464*     (2023.01)
    *G06N 3/09*     (2023.01)
    *H01Q 3/26*     (2006.01)
    *H01Q 1/28*     (2006.01)

(52) U.S. Cl.
    CPC ............. *G06N 3/0464* (2023.01); *G06N 3/09* (2023.01); *H01Q 3/267* (2013.01); *G01S 2013/0245* (2013.01); *H01Q 1/288* (2013.01)

(56) References Cited

OTHER PUBLICATIONS

"MathWorks Brand Guidelines," no author given; published by MathWorks; Natick, MA, USA; copyright in the year 2024. (Year: 2024).*

Zhou, Yang, Research on Phased Array Radar and Decoy Recognition Method Based on Spatial Polarization Characteristics, Harbin Engineering University, 2022, 73 pages.

Zahra Sarayloo et al., A Convolutional Neural Network Approach for Phased Array Calibration Using Power-Only Measurements, 2020 28th Iranian Conference on Electrical Engineering (ICEE), 2020, 6 pages.

Yang, Lijie et al., Key Technologies of Wideband Digital Phased Array For Ocean Surveillance, Science & Technology Review, 35(20): 119-125, 2017.

First Office Action in Chinese Application No. 202410188836.2 mailed on Aug. 15, 2024, 12 pages.

Notification to Grant Patent Right for Invention in Chinese Application No. 202410188836.2 mailed on Sep. 13, 2024. 4 pages.

* cited by examiner

200

METHODS FOR PHASED ARRAY CALIBRATION BASED ON CNN-LSTM USING POWER MEASUREMENT

CROSS-REFERENCE

This application claims priority to Chinese application No. 202410188836.2 filed on Feb. 20, 2024, the entire contents of which are incorporated herein by reference.

TECHNICAL FIELD

The present disclosure relates to a field of radio frequency and millimeter wave phased array technology, and in particular, to a method for phased array calibration based on convolutional neural network-long short-term memory (CNN-LSTM) using power measurement.

BACKGROUND

Phased array antennas are widely used in many fields such as low-earth orbit (LEO) satellite communications, radar sensing, wireless communications, and meteorological monitoring due to their advantages of flexible beam, strong anti-jamming capability, high integration, and low profile. However, there are transmission differences in amplitude and phase between channels of a phased array due to processing errors, material non-uniformity, and performance degradation over time. The amplitude-phase inconsistency of the channel results in an uncontrollable array feed, which can severely impact array performance. Therefore, calibrating the amplitude-phase error is fundamental to ensuring that the phased array works properly.

Phased array calibration techniques are mainly categorized into two types: internal calibration network and over-the-air (OTA) measurement calibration. The internal calibration network refers to a design of coupling lines in the array to achieve self-calibration of the phased array by comparing the signals coupled from the radio frequency (RF) link of each channel. The number of coupling lines required for the internal calibration network process increases dramatically with the size of the phased array, and there are design errors in the coupling lines themselves, making the approach impractical to use on large phased arrays.

The OTA measurement calibration includes near-field scanning method, mutual coupling calibration method, and rotating element electric field vector (REV) method. The near-field scanning method measures the amplitude and phase by mechanically moving the probe to align each array element one by one, and calculates the compensation amount according to the amplitude and phase distribution to realize the calibration, which requires high synchronization of the measuring instrument, long scanning time, and consequently results in low measurement efficiency. The mutual coupling calibration method estimates the amplitude-phase information of each channel by transmitting and receiving measurements of neighboring units in the array to calibrate the array, and although an outfield measurement device is not required, it is only applicable to transmitting and receiving phased arrays of a common aperture and thus has limited utility. The REV method calculates the channel amplitude-phase by measuring a sinusoidal curve of the signal amplitude with a phase change of a single antenna element, which is simple and does not require a high level of instrumentation, but requires too many measurements and additional measurements to determine a true solution and pseudo-solution, resulting in low measurement efficiency.

Therefore, it is hoped to provide a method for phased array calibration based on CNN-LSTM using power measurement, which can help to improve the phased array calibration accuracy and efficiency to meet the increasing demand for the phased array.

SUMMARY

One of the embodiments of the present disclosure provides a method for phased array calibration based on convolutional neural network-long short-term memory (CNN-LSTM) using power measurement, wherein the method comprises:

S1: modeling the phased array based on an array signal theory, setting a magnitude and phase for each channel randomly by program within an amplitude-phase error range, calculating and storing corresponding array radiated field data, repeating above operations to generate phased array signal data with amplitude-phase error information that meets a preset quantity condition;

S2: preprocessing the phased array signal data to obtain a training dataset;

S3: obtaining a calibration model by building a CNN-LSTM neural network model and inputting the training data with a label into a network for training until the network converges to an optimal state;

S4: measuring the phased array to be calibrated, preprocessing acquired measured data, and inputting the acquired measured data into the calibration model to obtain a calibration result;

wherein the S3 is accomplished by following sub-steps:

S3.1: building the CNN-LSTM neural network;

S3.2: designing a loss function for training a network model;

S3.3: obtaining a phased array calibration model by inputting the training dataset with the the label into the network for training until the network converges to the optimal state;

the S3.1 is accomplished by following sub-steps:

S3.1.1: the CNN-LSTM neural network including a Convolutional Neural Network (CNN), a Long Short-Term Memory (LSTM), and a complex fully connected network, wherein the CNN is configured to adaptively extract spatial feature information from input sequence data, and the LSTM is configured to utilize spatial features extracted by the CNN and combine temporal information of the sequence data for automatic modeling, and outputting a final prediction result by using the complex fully connected network immediately after the LSTM;

the S3.2 is accomplished by following sub-steps:

S3.2.1: calculating the mean square errors (MSEs) for both the real and imaginary parts of the predicted value and the true value, respectively, and adding the two MSEs as the loss function, the loss function being denoted as:

$$\text{Loss} = \frac{1}{n}\sum\nolimits_{i=1}^{n}(\Re(\hat{y}_i)-\Re(y_i))^2 + \frac{1}{n}\sum\nolimits_{i=1}^{n}(\Im(\hat{y}_i)-\Im(y_i))^2 \quad (1)$$

wherein $\hat{y}_i$, $y_i$ denotes the predicted value and the true value, respectively, $\Re(\cdot)$ denotes obtaining a complex real part, and $\Im(\cdot)$ denotes obtaining a complex imaginary part;

the S1 is accomplished by following sub-steps:

S1.1: establishing a phased array signal model; setting antenna to be measured as a two-dimensional planar phased array of size $N_x \times N_y$ arranged in a rectangle, describing a spatial orientation in terms of a pitch angle and an azimuth angle, and when the beam of the array under test is directed to $(\theta_s, \phi_s)$, a radiated electric field of the phased array in the measurement orientation $(\theta, \phi)$ being expressed as:

$$E(\theta, \phi) = \sum_{n=1}^{N_x} \sum_{m=1}^{N_y} G_{n,m}(\theta, \phi) I_{n,m} e^{jks\sin\theta(nd_x\cos\phi + md_y\sin\phi)} \quad (2)$$

wherein $k=2\pi/\lambda$, $\lambda$ is wavelength, $d_x$ and $d_y$ denote a row spacing and column spacing of array elements, respectively, m and n denote a row and column number of the array elements, respectively, $G_{n,m}(\theta, \phi)$ and $I_{n,m}$ denote an independent normalized directivity coefficient and a complex excitation including an amplitude-phase error of array element (m, n), respectively, and $I_{n,m}$ is denoted as:

$$I_{n,m} = a_{n,m} e^{j\delta_{n,m}} \cdot e^{-jks\sin(\theta_s)(nd_x\cos(\phi_s) + md_y\sin(\phi_s))} \quad (3)$$

wherein $a_{n,m}$ is a relative amplitude of initial complex excitation of the array element (m, n), and a theoretical range of $a_{n,m}$ is 0 to 1, and $\delta_{n,m}$ denotes a phase of the initial complex excitation of the array element (m, n), and a theoretical range of $\delta_{n,m}$ is $-180°$ to $+180°$, data for training the model is generated based on signal models described in formula (2) and formula (3);

S1.2: taking $(\theta_s, \phi_s)=(0,0)$ for beam pointing and $(\theta, \phi)=(0,0)$ for observation orientation, making the beam of array under test pointing in a normal direction, and placing probe antenna in the normal direction for measuring, wherein measured value is $E(0,0)$, making $G_{n,m}(\theta, \phi)=1$, substituting $(\theta_s, \phi_s)=(0,0)$ and $(\theta, \phi)=(0,0)$ according to the formula (2) and (3) to obtain:

$$E(0, 0) = \sum_{n=1}^{N_x} \sum_{m=1}^{N_y} a_{n,m} e^{j\delta_{n,m}} \quad (4)$$

wherein the formula (4) is $N_x \times N_y$ cumulative form, there is no sequential relationship among the items, and the items of the formula (4) are rearranged and rewritten to obtain:

$$E(0, 0) = \sum_{n=1}^{N_x} \sum_{m=1}^{N_y} a_{n,m} e^{j\delta_{n,m}} = \sum_{l=1}^{N_x \times N_y} a_l e^{j\delta_l} = \sum_{l=1}^{N} a_l e^{j\delta_l} \quad (5)$$

wherein $N=N_x \times N_y$ denotes a total number of array elements, and the formula (5) is written in matrix form as:

$$E(0, 0) = SQ = [e^{j0}, e^{j0}, \ldots, e^{j0}]_{1 \times N} \begin{bmatrix} a_1 e^{j\delta_1} \\ a_2 e^{j\delta_2} \\ \vdots \\ a_N e^{j\delta_N} \end{bmatrix}_{N \times 1} \quad (6)$$

wherein Q denotes an array initial complex excitation matrix containing error components, and S denotes a phase setting matrix of measurement, a count of columns of the phase setting matrix are equal to a count of array elements N and the count of rows is determined by a count of measurements, each row describes a phase shift value of each array element in a single measurement, elements of S are continuously changed during a calibration process, simultaneously measuring and recording corresponding $E(0,0)$ to obtain a data sequence, and estimating the array initial complex excitation matrix Q based on the data sequence;

S1.3: solving the array initial complex excitation matrix Q by performing 2N+1 measurements, wherein all array elements are kept in an initial state without phase shifting for a first measurement, and after which each array element is sequentially phase shifted by 90° and 180° for measurement, wherein the 2N+1 measurements corresponding to the phase alignment matrix S is expressed as:

$$S = \begin{bmatrix} s_{1,1} & s_{1,2} & \ldots & s_{1,N} \\ s_{2,1} & s_{2,2} & \ldots & s_{2,N} \\ s_{3,1} & s_{3,2} & \ldots & s_{3,N} \\ \vdots & \vdots & \ddots & \vdots \\ s_{2N,1} & s_{2N,2} & \ldots & s_{2N,N} \\ s_{(2N+1),1} & s_{(2N+1),2} & \ldots & s_{(2N+1),N} \end{bmatrix} = \begin{bmatrix} e^{j0} & e^{j0} & \ldots & e^{j0} \\ e^{j\frac{\pi}{2}} & e^{j0} & \ldots & e^{j0} \\ e^{j\pi} & e^{j0} & \ldots & e^{j0} \\ \vdots & \vdots & \ddots & \vdots \\ e^{j0} & e^{j0} & \ldots & e^{j\frac{\pi}{2}} \\ e^{j0} & e^{j0} & \ldots & e^{j\pi} \end{bmatrix} \quad (7)$$

wherein when generating the training data by simulating measurements with the program, each element of the array initial complex excitation matrix Q in the formula (6) is randomly generated in accordance with a preset error range, a magnitude of each element ranges from 0.1 to 1, and a phase of each element ranges from $-180°$ to $+180°$, and after generating a set of initial excitations randomly each time to obtain the array initial complex excitation matrix Q, substituting the phase alignment matrix S and the array initial complex excitation matrix Q into the formula (6) to calculate an electric field vector sequence with a length of 2N+1, and representing the sequence by a matrix E of size $(2N+1) \times 1$:

$$E = SQ = [E(0, 0)_1, E(0, 0)_2, \ldots, E(0, 0)_{2N+1}] = [E_1, E_2, \ldots, E_{2N+1}] \quad (8)$$

wherein each element $E_i = E(0,0)_i$, $i=0,1, \ldots, 2N+1$ represents a radiation electric field vector measured by phase-shifting the phased array according to i-th row of the phase alignment matrix S;

S1.4: randomly generating the array initial complex excitation matrix Q, calculating the electric field vector sequence E by substituting the array initial complex excitation matrix Q and the phase alignment matrix S in the formula (7) into the formula (6), and saving the array initial complex excitation matrix Q and the electric field vector sequence E one by one corresponding to each other, and repeating the S1.4 until generated data meets a training requirement, and completing acquisition of raw data.

One embodiment of the present disclosure provides a phased array automatic calibration device based on CNN-LSTM using power measurement, comprising: at least one processor; and a memory communicatively coupled to the at least one processor, wherein the memory stores instructions executable by the at least one processor, and the instructions is configured to be executed by the processor to implement the method for phased array calibration based on CNN-LSTM using power measurement.

One embodiment of the present disclosure provides a computer-readable storage medium, wherein the computer-readable storage medium stores computer instructions, and the computer instructions are configured to be executed by the computer to implement the method for phased array calibration based on CNN-LSTM using power measurement.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
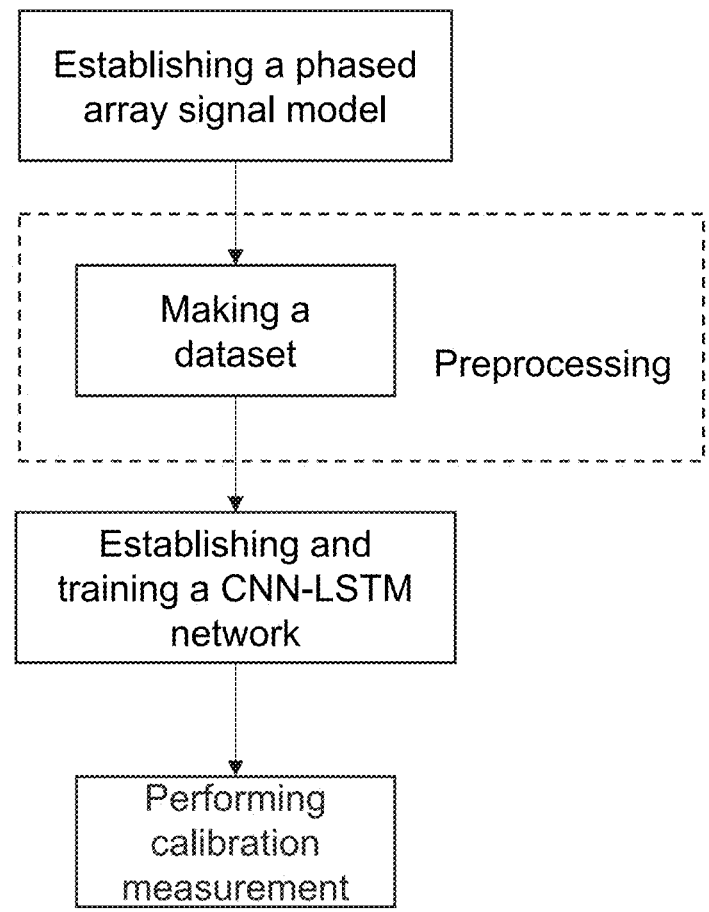
FIG. 1 is a flowchart illustrating an exemplary process for phased array calibration based on CNN-LSTM using power measurement according to some embodiments of the present disclosure.

In order to more clearly illustrate the technical solutions of the embodiments of the present disclosure, the following will briefly describe the accompanying drawings to be used in the description of the embodiments. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit", and/or "module" as used herein are used to distinguish between different components, elements, parts, sections, or assemblies at different levels. However, these words may be replaced by other expressions if other words accomplish the same purpose.

As shown in the present disclosure and in the claims, unless the context clearly suggests an exception, the words "a," "an," "one," and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or device may also include other steps or elements.

Flowcharts are used in the present disclosure to illustrate operations performed by a system in accordance with the embodiments of the present disclosure. It should be appreciated that the preceding or following operations are not necessarily performed in an exact sequence. Instead, steps can be processed in reverse order or simultaneously. Also, it is possible to add other operations to these processes, or to remove a step or steps from these processes.

FIG. 1 is a flowchart illustrating an exemplary process for phased array calibration based on CNN-LSTM using power measurement according to some embodiments of the present disclosure. The process is executed by a processor. The processor is used to process information and/or data related to the process for phased array calibration based on convolutional neural network-long short-term memory (CNN-LSTM) using power measurement. In some embodiments, the processor may process data, information, and/or processing results obtained from other devices or components of the system, and execute program instructions to perform one or more functions described in the present disclosure based on the data, information, and/or processing results.

In some embodiments, the process for phased array calibration based on CNN-LSTM using power measurement may include following steps S1-S4:

S1: modeling the phased array based on an array signal theory, setting a magnitude and phase for each channel randomly by program within an amplitude-phase error range, calculating and storing corresponding array radiated field data, repeating above operations to generate phased array signal data with amplitude-phase error information that meets a preset quantity condition.

The array signal theory refers to a theory related to array signals. According to some embodiments of the present disclosure, the exemplary array signal theory may include array signal processing processes, phased array beam formation, or the like.

Modeling the phased array refers to building a phased array signal model. More descriptions of modeling the phased array signal model may be found in the step S1.1 below. The phased array signal model is a model used to generate phased array signal data. In some embodiments, the phased array signal model may also be referred to as a phased array calibration signal model or a signal model. The phased array signal data refers to data related to the phased array signal, e.g., the phased array signal data may include radiated electric field vectors or the like.

The program for setting the amplitude and phase of each channel refers to a simulation program for setting the amplitude and phase of each channel of the phased array. The exemplary program may include MATLAB® or the like. More descriptions for setting the amplitude and phase may be found in the step S1.4 below.

The amplitude-phase error range is an error range between amplitude and phase preset for each channel of the phased array. The amplitude-phase error range may be set by a system or by a human. The amplitude-phase error range may also be called a preset error range.

The array radiated field data refers to information related to a radiated field of the phased array. For example, the array radiated field data may include a corresponding radiated electric field of the phased array, a vector of the radiated electric field, complex excitation, or the like.

The preset quantity condition is a preset quantity condition to be satisfied by the phased array signal data. The preset quantity condition may be set by a system or by a human. The exemplary preset quantity condition may be that the amount of the phased array signal data exceeds a signal data threshold. The signal data threshold may be set by a technician.

The amplitude-phase error information is information related to the amplitude-phase error between the channels of the phased array.

In some embodiments, the step S1 may further comprise steps S1.1-S1.4 as follows:

S1.1: establishing a phased array signal model; setting antenna to be measured as a two-dimensional planar phased array of size $N_x \times N_y$ arranged in a rectangle, describing a spatial orientation in terms of a pitch angle and an azimuth angle, and when the beam of phased array to be measured is directed to $(\theta_s, \phi_s)$, a radiated electric field of the phased array in the measurement orientation $(\theta, \phi)$ being expressed as:

$$E(\theta, \phi) = \sum_{n=1}^{N_x} \sum_{m=1}^{N_y} G_{n,m}(\theta, \phi) I_{n,m} e^{jk\sin\theta(nd_x\cos\phi + md_y\sin\phi)} \quad (2)$$

Wherein $k=2\pi/\lambda$, $\lambda$ is wavelength, $d_x$ and $d_y$ denote a row spacing and column spacing of array element, respectively, m and n denote a row and column number of the array element, respectively, $G_{n,m}(\theta, \phi)$ and $I_{n,m}$ denote normalized an independent directivity coefficient and a complex excitation including an amplitude-phase error of array element (m, n), respectively, and $I_{n,m}$ is denoted as:

$$I_{n,m} = a_{n,m} e^{j\delta_{n,m}} \cdot e^{-jk\sin(\theta_s)(nd_x\cos(\phi_s)+md_y\sin(\phi_s))} \quad (3)$$

Wherein $a_{n,m}$ is a relative amplitude of initial complex excitation of the array element (m, n), a theoretical range of $a_{n,m}$ is 0 to 1, and $\delta_{n,m}$ denotes a phase of the initial complex excitation of the array element (m, n), a theoretical range of $\delta_{n,m}$ is −180° to +180°, data for training the model is generated based on signal models described in formula (2) and formula (3).

S1.2: In order to simplify the measurement to the greatest extent possible, taking $(\theta_s, \phi_s)=(0,0)$ for beam pointing and $(\theta, \phi)=(0,0)$ for observation orientation, making measured array beam pointing in a normal direction, and placing probe antenna in the normal direction for measuring, wherein measured value is E(0,0). Due to the factors such as mutual coupling, processing error, the normalized independent directional coefficients of different array elements are often not the same, the amplitude-phase error caused by such differences can also be included in a consideration of $I_{n,m}$. Therefore, in order to simplify the discussion, making $G_{n,m}(\theta, \phi)=1$, substituting $(\theta_s, \phi_s)=(0,0)$ and $(\theta, \phi)=(0,0)$ according to the formula (2) and (3) to obtain:

$$E(0, 0) = \sum_{n=1}^{N_x} \sum_{m=1}^{N_y} a_{n,m} e^{j\delta_{n,m}} \quad (4)$$

wherein the formula (4) is $N_x \times N_y$ cumulative form, there is no sequential relationship among the items, and the items of the formula (4) are rearranged and rewritten to obtain:

$$E(0, 0) = \sum_{n=1}^{N_x} \sum_{m=1}^{N_y} a_{n,m} e^{j\delta_{n,m}} = \sum_{l=1}^{N_x \times N_y} a_l e^{j\delta_l} = \sum_{l=1}^{N} a_l e^{j\delta_l} \quad (5)$$

wherein $N=N_x \times N_y$ denotes a total number of array elements, l denotes a reordering of the preceding ordinates reordered subscript, $a_l$ denotes a relative amplitude of the simplified initial complex excitation, and $\delta_l$ denotes a relative phase of the simplified initial complex excitation.

In some embodiments of the present disclosure, the formula (5) is only related to the number of array elements and the complex excitation of each array element containing the amplitude-phase error, which is not related to array parameters such as operating frequency, pointing angle, array position, array element arrangement, array element spacing, array element form, or the like. Therefore, the data generated with the information of the amplitude-phase error according to the formula for the CNN-LSTM neural network training model may be theoretically calibrated with one training at any frequency and any form of the array (line array, circular array, heterogeneous array, common array, etc.), uniform array, and non-uniform array, showing strong versatility. The formula (5) is written in matrix form as:

$$E(0, 0) = SQ = \left[ e^{j0}, e^{j0}, \ldots, e^{j0} \right]_{1 \times N} \begin{bmatrix} a_1 e^{j\delta_1} \\ a_2 e^{j\delta_2} \\ \vdots \\ a_N e^{j\delta_N} \end{bmatrix}_{N \times 1} \quad (6)$$

Wherein Q denotes an array initial complex excitation matrix containing error components, and S denotes a phase setting matrix of measurement, a count of columns of the phase setting matrix are equal to a count of array elements N and the count of rows is determined by a count of measurements, each row describes a phase shift value of each array element in a single measurement, elements of S are continuously changed during a calibration process, simultaneously measuring and recording corresponding E(0, 0) to obtain a data sequence, and estimating the array initial complex excitation matrix Q based on the data sequence; the phase setting matrix $S=[e^{j0}, e^{j0}, \ldots, e^{j0}]_{1 \times N}$ in the formula (6) has only one row, representing one measurement and each element being $e^{j0}$, which indicates that all the array elements keep the initial phase state without phase shifting for the measurement.

S1.3: solving the array initial complex excitation matrix Q by performing 2N+1 measurements, wherein all array elements are kept in an initial state without phase shifting for a first measurement, and after which each array element is sequentially phase shifted by 90° and 180° for measurement, wherein the 2N+1 measurements corresponding to the phase setting matrix S is expressed as:

$$S = \begin{bmatrix} S_{1,1} & S_{1,2} & \cdots & S_{1,N} \\ S_{2,1} & S_{2,2} & \cdots & S_{2,N} \\ S_{3,1} & S_{3,2} & \cdots & S_{3,N} \\ \vdots & \vdots & \ddots & \vdots \\ S_{2N,1} & S_{2N,2} & \cdots & S_{2N,N} \\ S_{(2N+1),1} & S_{(2N+1),2} & \cdots & S_{(2N+1),N} \end{bmatrix} = \begin{bmatrix} e^{j0} & e^{j0} & \cdots & e^{j0} \\ e^{j\frac{\pi}{2}} & e^{j0} & \cdots & e^{j0} \\ e^{j\pi} & e^{j0} & \cdots & e^{j0} \\ \vdots & \vdots & \ddots & \vdots \\ e^{j0} & e^{j0} & \cdots & e^{j\frac{\pi}{2}} \\ e^{j0} & e^{j0} & \cdots & e^{j\pi} \end{bmatrix} \quad (7)$$

wherein when generating the training data by simulating measurements with the program, each element of the array initial complex excitation matrix Q in the formula (6) is randomly generated in accordance with a preset error range, a magnitude of each element ranges from 0.1 to 1, and a phase of each element ranges from −180° to +180°, and after generating a set of initial excitations randomly each time to obtain the array initial complex excitation matrix Q, substituting the phase setting matrix S and the array initial complex excitation matrix Q into the formula (6) to calculate an electric field vector sequence with a length of 2N+1, and representing the electric field vector sequence by a matrix E of size (2N+1)×1:

$$E = SQ = [E(0, 0)_1, E(0, 0)_2, \ldots, E(0, 0)_{2N+1}] = [E_1, E_2, \ldots, E_{2N+1}] \quad (8)$$

wherein each element $E_i = E(0,0)_i$, i=0,1 . . . , 2N+1 represents a radiation electric field vector measured by phase-shifting the phased array according to i-th row of the phase setting matrix S.

S1.4: randomly generating the array initial complex excitation matrix Q, calculating the electric field vector sequence E by substituting the array initial complex excitation matrix Q and the phase setting matrix S in the formula (7) into the formula (6), and saving the array initial complex excitation matrix Q and the electric field vector sequence E one by one corresponding to each other, and repeating the S1.4 until generated data meets a training requirement, and completing acquisition of raw data.

The raw data is generated phased array signal data.

Some embodiments of the present disclosure solve the problem of difficulty in obtaining a large amount of data required for neural network training by innovatively establishing the phased array signal model, which can be conveniently generated with error information in large quantities by utilizing a simulation program without the need for actual measurement of the phased array signal data for neural network training.

In some embodiments, the processor may obtain historical error data corresponding to a phased array feature; based on the historical error data, determine a target error distribution corresponding to the phased array feature; and based on the target error distribution and the amplitude-phase error range, set an amplitude and the phase. More descriptions of the amplitude-phase error range may be found in the step S1.

The phased array feature is a feature associated with the phased array. In some embodiments, the phased array feature may include a number of array elements, an operating frequency, an array form, an array spacing, an array type, or the like.

In some embodiments, the phased array feature may be obtained in a variety of ways. For example, the processor may obtain the phased array feature through various measurement devices (e.g., a vector network analyzer, a RF test equipment, etc.), electromagnetic simulation software (e.g., ANSYS®, CST Microwave Studio®, etc.), and product specifications are provided by a phased array manufacturer. The phased array feature may also be entered by a user, and the present disclosure is not limited herein.

The historical error data refers to an amplitude-phase error corresponding to different phased array features in actual operation. There is a large amount of the historical error data corresponding to the same phased array feature in actual operation. The processor may obtain the historical error data based on historical data.

The target error distribution is a distribution of amplitude-phase errors in the historical error data within the amplitude-phase error range. Exemplarily, if the amplitude-phase error range is 0-10, the target error distribution may include a proportion of a quantity of historical error data with amplitude and phase errors in different sub-ranges such as 0-1, 1-2, . . . , 9-10, or the like. It should be noted that the values enumerated in the foregoing are for example only and do not represent the reasonableness of the values.

According to some embodiments of the present disclosure, the processor may determine the target error distribution based on statistics of the historical error data.

For example, the processor may calculate statistical values for a large amount of the historical error data corresponding to each phased array feature, thereby determining the target error distribution corresponding to the phased array feature. The statistical values may include a proportion of different historical error data, a density distribution of historical amplitude-phase errors, or the like.

Exemplarily, the processor may draw a scatter plot based on the historical error data corresponding to the phased array feature, a point in the plot represents a historical error data, and the horizontal and vertical axes of the scatter plot may represent a magnitude error and a phase error, respectively; the processor may perform clustering on positions of the points in the scatter plot to obtain multiple sub amplitude and phase error ranges and a quantity or proportion of points within the corresponding ranges, and take the plurality of sub amplitude and phase error ranges and the corresponding number or proportion of points within the ranges as the target error distribution.

The exemplary clustering processes may include density clustering, K-means clustering, or the like. Taking K-means clustering as an example, the system may preset a number of clusters (i.e., a value of k), and according to the preset number of clusters, coordinates of different points in the scatter plot are clustered in order to obtain k clusters as k sub amplitude and phase error ranges, and a distribution of the number of points within the multiple clusters is the target error distribution. In the k sub amplitude and phase error ranges, interval widths of the amplitude and phase error ranges may be the same, e.g., the interval width of the sub amplitude and phase error ranges corresponding to each cluster may be a ratio of the interval width of the amplitude and phase error range to k.

According to some embodiments of the present disclosure, the processor may correct the historical error data by a preset algorithm; and based on the historical error data after the correction process, determine the target error distribution.

The correction process refers to a correction process of removing anomalous data from the historical error data before determining the target error distribution.

The preset algorithm is an algorithm that is preset for performing the correction processing. In some embodiments, the preset algorithm may be preset by a system or by a human.

In some embodiments, the preset algorithm may include following steps S211-S215:

S211, arbitrarily selecting an error feature as a slicing feature from two error features in the historical error data.

The error features are different types of error features in the historical error data. According to some embodiments of the present disclosure, the error features of the historical error data may include both magnitude error and phase error.

The slicing feature is a feature that slices a sample set. More descriptions of the sample set may be found in later related descriptions.

The slicing feature may be selected from any of the two aforementioned error features. For example, when the magnitude error is used as the slicing feature, the processor may slice the sample set based on the magnitude error of each historical error data.

S212, based on any one of the slicing points in the slicing feature, slicing the sample set to obtain sample sub-sets, which are determined based on the historical error data.

The slicing points refer to points in the sample set that need to be sliced. The processor may choose any point between the maximum and minimum values of the slicing features in the sample set as the slicing point.

The sample set is a sample data set obtained by random sampling from the historical error data. In some embodiments, the sample set may be determined based on the historical error data. For example, the processor may randomly select data points with a preset scale from the historical error data based on the preset scale to construct the sample set. The preset scale may be preset by a system or by a human. The exemplary preset scale may be 2000 data.

In some embodiments of the present disclosure, the processor may determine a sampling rate based on a variance of the historical error data; based on the sampling rate, randomly select data from the historical error data to construct the sample set.

The sampling rate is a percentage of the historical error data from which selection samples are taken. In some embodiments, the processor may determine the sampling rate based on the variance of the historical error data, with the greater the variance of the historical error data, the higher the sampling rate.

A correspondence between the variance and the sampling rate is determined based on a statistical determination of multiple sampling records. For example, the processor may set different sampling rates for the historical error data of the same variance to determine different sample sets, perform steps S211-S215 for each sample set to determine the anomalous data corresponding to the different sampling rates, and determine an accuracy of the anomalous data by a technician, and use the sampling rate corresponding to an accuracy higher than an accuracy threshold as the sampling rate corresponding to that variance.

In some embodiments, the processor may determine a number of samples to be selected based on the sampling rate and the amount of the historical error data, and randomly select historical error data with a sample size to construct a sample set.

The larger the variance of the historical error data, the more dispersed the amplitude-phase error is distributed in the historical data, and in some embodiments of the present disclosure, determining the sampling rate based on the variance of the historical error data can increase the sampling rate when the variance of the historical error data is large, so that the sample set tries to encompass amplitude-phase errors of different sizes to ensure the accuracy of the subsequent determination of the slicing parameters.

The sample sub-sets are a result of slicing and dicing the sample set. The processor may slice the sample set based on the slicing point and divide the sample set into two sample sub-sets bounded by the slicing point. The two sample sub-sets include a left sub-set and a right sub-set, wherein the left sub-set is a set formed by points with slicing features smaller than the slicing point of the slicing feature, and the right sub-set is a set formed by points with slicing features larger than the slicing point of the slicing feature.

S213, in response to the sample sub-set not satisfying a first preset condition, designating the sample sub-set that does not satisfy the first preset condition as a new sample set, and repeating steps S211 and S212, and slicing the new sample set to obtain a new sample sub-set; in response to the sample sub-set satisfying the first preset condition, obtaining slicing sub-parameters for this round of slicing and performing S214.

The first preset condition refers to a preset judgment condition for determining whether to continue slicing downward. In some embodiments, the first preset condition may include that the number of points in each sample sub-set obtained by the slicing is not higher than a preset number threshold. The preset number threshold may be preset by a system or by a human.

The slicing sub-parameters are parameters associated with a slicing process of step S213. In some embodiments, the slicing sub-parameters may include the slicing features and slicing points selected for each slicing process, which begin with a first slicing process. The processor may record the slicing parameters based on the slicing process.

S214, in response to the sample sub-set not satisfying a second preset condition, repeating steps S211-S213 based on an initial sample set to determine new slicing sub-parameters; in response to the sample sub-set satisfying the second preset condition, stopping the slicing and determining the slicing parameters based on the slicing sub-parameters.

The second preset condition is a preset judgment condition for determining whether to stop slicing or to re-run the first round of slicing. In some embodiments, the second preset condition may include that the slicing result converges.

The convergence of the slicing result indicates that specific points included in the sub-set of multiple samples obtained from each slicing process tend to be consistent, i.e., the specific points included in the sub-set of multiple samples obtained from each slicing process no longer change.

The slicing parameters are parameters related to the overall slicing process. The slicing parameters are formally the same as the slicing sub-parameters and may include the slicing features and slicing points selected for each slicing process. The slicing parameters may be used to determine whether a point in the sample sub-set is anomalous. Determining the slicing parameters based on the slicing sub-parameters refers to determining the slicing parameters of the sample set based on the slicing parameters of the sample sub-set over multiple slicing processes when the sample sub-set satisfies the second preset condition. In some embodiments, the processor may determine a mean value of the slicing sub-parameters corresponding to the slicing parameters over the multiple slicing processes as the slicing parameters after the slicing results converge.

S215, performing a correction process for the historical error data based on slicing parameters.

In some embodiments, the processor may determine whether a point in the sample set is anomalous based on the slicing parameters. The processor may slice the sample set based on the slicing parameters, count the number of times each point is ultimately sliced; based on the number of times each point is ultimately sliced, determine the anomalous value, take the historical error data corresponding to anomalous values exceeding an anomaly threshold as the anomalous data, and remove the anomalous data from the sample set, i.e., completing the correction process.

The number of times a point is finally sliced is a number of rounds that have gone through slicing when the sample sub-set in which the point is located satisfies the first preset condition.

The anomalous value may reflect an abnormality degree of the point. In some embodiments, the anomalous value is related to a ratio of the number of times the point was ultimately sliced to the total number of times it was sliced. Exemplarily, the anomalous value may be represented by the following formulation:

$$A = 2 - \frac{D}{H};$$

wherein A is the anomalous value, D is the number of times that the point was ultimately sliced, and H is the total number of times it was slices. It can be seen that the anomalous value is a value between 0.5 and 1. The closer the anomalous value is to 1, the smaller the number of times the point is ultimately sliced, indicating that the point tends to be an anomalous sample. The anomalous value is closer to 0.5, the closer the number of slices is to the total number of samples, indicating that the point is more inclined to be a normal sample. The anomaly threshold may be determined systematically or artificially, e.g., the anomaly threshold may be 0.9.

In some embodiments, the correction processing of the historical error data by the preset algorithm can eliminate anomalous data in the historical error data, which can help to improve the accuracy of the determination of the target error distribution.

In some embodiments, the processor may determine the target error distribution based on the historical error data after correction processing by the process of determining the target error distribution, more descriptions of the process may be found in the preceding related descriptions.

In some embodiments of the present disclosure, the correction process is performed on the historical error data, which helps to improve the accuracy of the determination of the target error distribution.

In some embodiments, the processor may set the magnitude and phase in multiple ways based on the target error distribution. For example, the processor may randomly generate the magnitude and the phase within each sub amplitude and phase error range based on a proportion of the historical error data in different sub amplitude and phase error ranges in the target error distribution.

In some embodiments of the present disclosure, generating the magnitude and the phase based on the target error distribution can make the magnitude and the phase corresponding to different sub amplitude and phase error ranges within the amplitude-phase error range vary in number, compared to generating the magnitude and phase completely randomly in the amplitude and phase error range, marking the generated magnitude and phase fitting the actual situation more closely.

S2: preprocessing the phased array signal data to obtain a training dataset.

In some embodiments, the generated data refers to phased array signal data generated by the step S1. The preprocessing refers to a process of processing the phased array signal data to obtain the training dataset. The training dataset is a dataset used to train the CNN-LSTM neural network model. The training dataset may include a sequence of features X as input features to the CNN-LSTM neural network model, and a corresponding sequence of labels Y, more descriptions may be found in the related description below.

In some embodiments, the step S2 may include steps S2.1-S2.3 as follows:

S2.1: converting the electric field vector sequence E into a power value sequence P:

$$P = [P_1, P_2, ..., P_{2N+1}] = [|E_1|^2, |E_2|^2, ...|E_{2N+1}|^2] \quad (9)$$

obtaining a real number sequence X by normalizing the power value sequence with a maximum element value of the power value sequence P, and using the real number sequence X as an input feature of the neural network:

$$X = \frac{P}{\max(P)} \quad (10)$$

Wherein max(•) denotes taking a maximum value of matrix;

S2.2: normalizing the array initial complex excitation matrix Q with an electric field vector $E_1$ in an initial state, wherein a normalization result is denoted as $\overline{Q}$:

$$\overline{Q} = \frac{Q}{E_1} = \begin{bmatrix} \frac{a_1}{|E_1|} e^{j(\delta_1 - \angle E_1)} \\ \frac{a_2}{|E_1|} e^{j(\delta_2 - \angle E_1)} \\ \vdots \\ \frac{a_N}{|E_1|} e^{j(\delta_N - \angle E_1)} \end{bmatrix}_{N \times 1} \quad (11)$$

wherein the electric field vector $E_1$ in the initial state refers to a first element of the electric field vector sequence E, $|E_1|$ and $\angle E_1$ denote an amplitude and phase of the electric field vector $E_1$, respectively;

obtaining complex sequence Y by transforming the normalized array initial complex excitation matrix $\overline{Q}$ into a corresponding power form, retaining phase information, and normalizing it with a maximum power value, and using the complex sequence Y as a label for the training data:

$$Y = \frac{|\overline{Q}| \odot \overline{Q}}{\max(|\overline{Q}| \odot |\overline{Q}|)} \quad (12)$$

wherein |•| denotes taking modulus of a complex matrix element by element, the result is still a matrix, ⊙ denotes Hadamard product, and max(•) denotes taking a maximum value of the matrix; and S2.3: converting the electric field vector sequence E and the array initial complex excitation matrix Q generated by the S2.1 and S2.2 into a corresponding feature sequence X and label sequence Y and saving the feature sequence X and label sequence Y to complete production of the training dataset.

S3: obtaining a calibration model by building a CNN-LSTM neural network model and inputting training data containing a label into a network for training until the network converges to an optimal state.

More descriptions of the CNN-LSTM neural network model may be found in the related description of step S3.1.1 below.

The calibration model is a model used for subsequent phased array calibration measurements. The calibration model may also be referred to as the phased array calibration model.

In some embodiments, the step S3 may include steps S3.1-S3.3 as follows:

S3.1: building the CNN-LSTM neural network.

In some embodiments, the CNN-LSTM neural network model may also be referred to as a network, a CNN-LSTM neural network, a model, or a neural network.

In some embodiments, the step S3.1 may include step S3.1.1 as follows:

S3.1.1: the CNN-LSTM neural network including a Convolutional Neural Network (CNN), a Long Short-Term Memory (LSTM), and a complex fully connected network, wherein the CNN is configured to adaptively extract spatial feature information from input sequence data, and the LSTM is configured to utilize spatial features extracted by the CNN and combine temporal information of the sequence data for automatic modeling, and outputting a final prediction result by using the complex fully connected network immediately after the LSTM. The spatial feature may also be referred to as spatial feature information.

Figure 3:
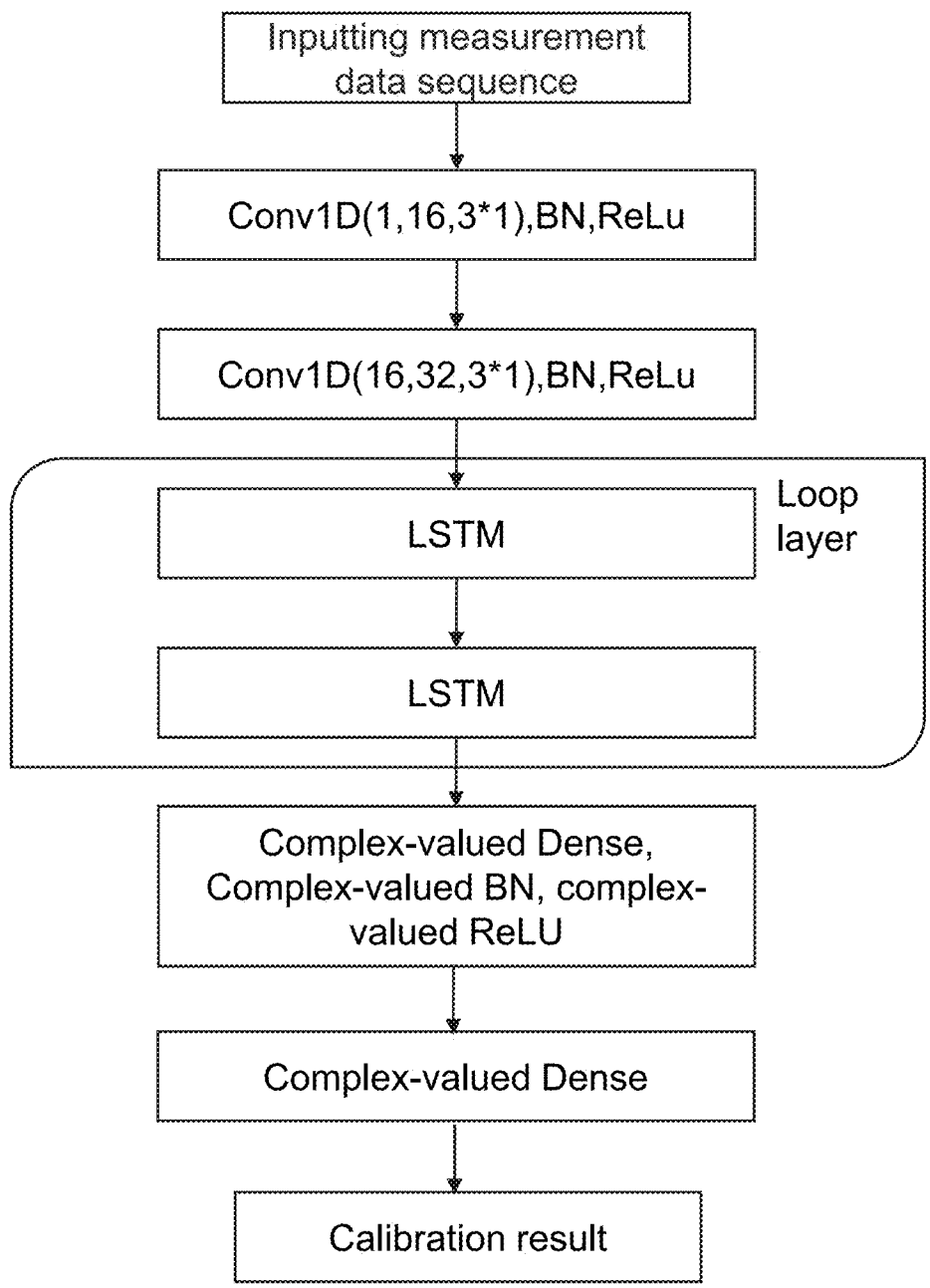
FIG. 3 is a schematic diagram illustrating a CNN-LSTM neural network model according to some embodiments of the present disclosure.

FIG. 3 is a schematic diagram illustrating a CNN-LSTM neural network model according to some embodiments of the present disclosure. as shown in FIG. 3, the CNN-LSTM neural network model contains a total of three stages, i.e., CNN, LSTM, and the complex fully connected network, and the CNN is used for adaptively extracting spatial feature information from input sequence data, which consists of two one-dimensional convolutional layers (i.e., conv1 and conv2); the LSTM can utilize the spatial features extracted by the CNN and combine with temporal information of the sequence data to automatically model the sequence data; since the target solution is a complex sequence describing the excitation amplitudes and phases of the individual arrays, a final prediction is output by adopting the two complex fully-connected layers immediately after the LSTM.

In some embodiments, a small phased array with a number of array elements of 16 is used as an example to refine the introduction of the CNN-LSTM neural network model in the step S3.1.1. It should be noted that each parameter in the CNN-LSTM neural network model is determined based on the number of array elements, which takes into account the calibration accuracy and the calibration efficiency, and in other embodiments, a person of ordinary skill in the art can determine the parameters without creative labor, and for a small phased array with an array element number of 16, step S3.1.1 can be realized by the following steps S3.1.1.1-S3.1.1.3:

S3.1.1.1: the CNN stage containing two one-dimensional convolutional layers (i.e., conv1 and conv2), wherein the conv1 uses 16 convolution kernels of size 3×1 with a stride of 1 for convolution and is activated by ReLU function after batch normalization; the conv2 uses 32 convolutional kernels of size 3×1 with a stride of 1 for convolution, and is activated by ReLU function after batch normalization.

S3.1.1.2: the LSTM stage containing two LSTM layers, wherein a first LSTM input size is set to 32, a hidden layer width of the first LSTM input size is set to 128, the number of layers is set to 2, a second LSTM input size is set to 128, a hidden layer width of the second LSTM input size is set to 64, and the number of layers is set to 2.

S3.1.1.3: the complex fully connected network containing two layers including complex linear layers Cfc1 and Cfc2, wherein an input of Cfc1 takes over an output of LSTM, an output is a complex sequence of 128×1, which is input to Cfc2 after complex batch normalization and complex ReLU activation, and the final prediction is output by Cfc2.

S3.2: designing a loss function for training a neural network model.

The loss function is a function used to calculate a difference between the predicted value and the true value of the model's output when training the CNN-LSTM neural network model.

In some embodiments, the step S3.2 may include step S3.2.1 as follows:

S3.2.1: both the training labels (i.e., true values) and the predicted value that the model output being complex sequences, wherein to evaluate the model's predictive performance, mean square errors for both the real and imaginary parts of a predicted value and a true value are calculated, respectively, and the two mean square errors is added as the loss function, the loss function is denoted as:

$$\text{Loss} = \frac{1}{n}\sum_{i=1}^{n}(\Re(\hat{y}_i) - \Re(y_i))^2 + \frac{1}{n}\sum_{i=1}^{n}(\Im(\hat{y}_i) - \Im(y_i))^2 \quad (1)$$

wherein $\hat{y}_i$ and $y_i$ denote the predicted value and the true value, respectively, $\Re(\bullet)$ denotes obtaining a complex real part, and $\Im(\bullet)$ denotes obtaining a complex imaginary part.

In some embodiments, the step S3.2 may include the following step S3.2.2:

S3.2.2: due to a sensitivity of sample points near a origin (0, 0) of a complex plane rectangular coordinate system are more sensitive to errors than external sample points, a very small error of real or imaginary part can cause a large amplitude error. The real part and the imaginary part are nonlinearly mapped before calculating the mean square errors, the nonlinear mapping being expressed as:

$$f(x) = \frac{1 - e^{(-1024x)}}{1 + e^{(-1024x)}}\sqrt{|x + \epsilon|}, \epsilon = 10^{-6} \quad (13)$$

wherein $\epsilon$ is a hyperparameter with an extremely small numerical value for robustness enhancement, a value of the hyperparameter is $10^{-6}$, and a loss function after applying the nonlinearly mapped is finally expressed as:

$$\text{Loss} = \frac{1}{n}\sum_{i=1}^{n} f(\Re(\hat{y}_i)) - f(\Re(y_i))^2 + \frac{1}{n}\sum_{i=1}^{n} (f(\Im(\hat{y}_i)) - f(\Im(y_i)))^2 \quad (14)$$

Figure 4:
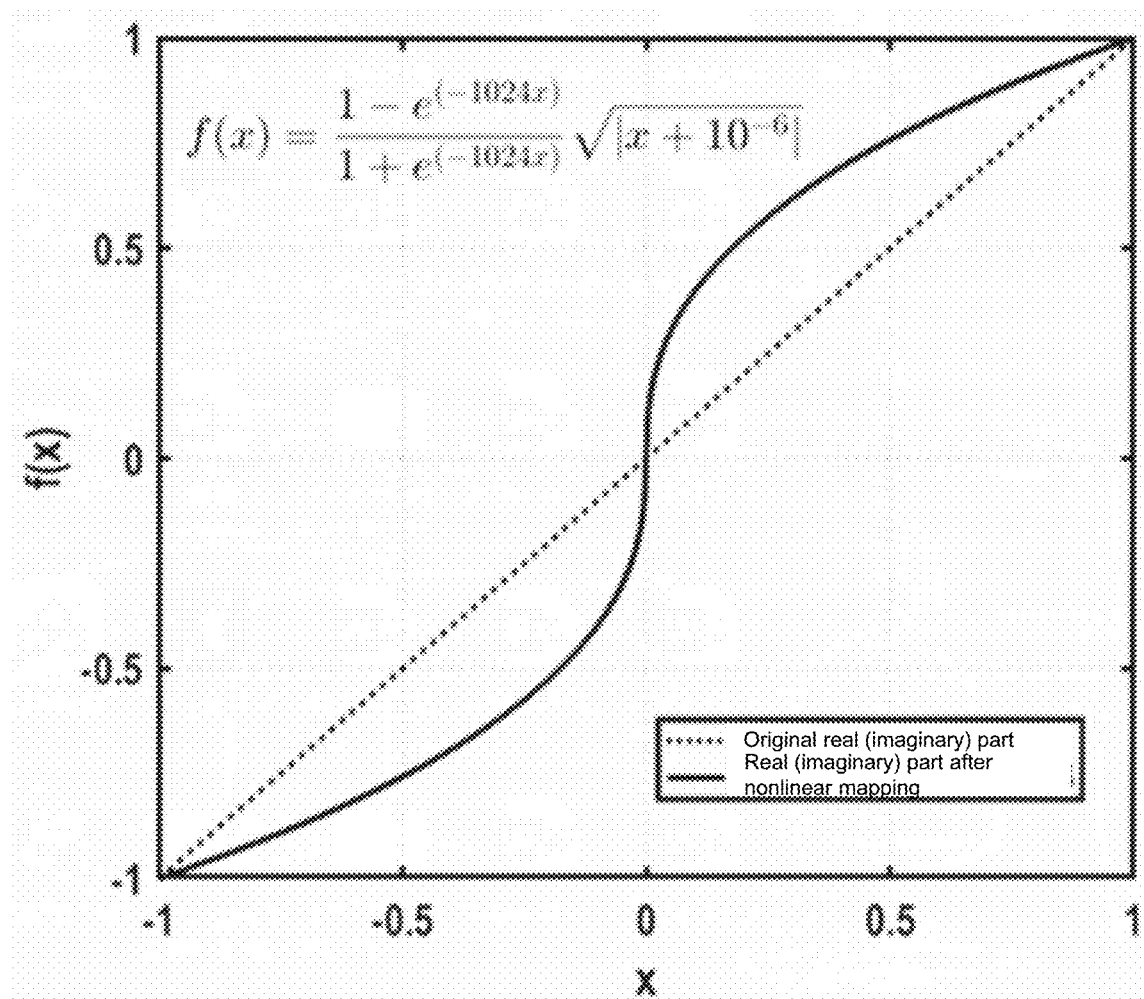
FIG. 4 is a schematic diagram illustrating a visualized comparison before and after nonlinear mapping of a loss function to a real (imaginary) part of a complex excitation as a label of training data according to some embodiments of the present disclosure.

FIG. 4 is a schematic diagram illustrating a visualized comparison before and after nonlinear mapping of a loss function to a real (imaginary) part of a complex excitation as a label of training data according to some embodiments of the present disclosure. As shown in FIG. 4, the horizontal axis shows values of the real and imaginary parts, the vertical axis shows a nonlinear mapping, and the solid line shows a real (imaginary) part after the nonlinear mapping; the dashed line shows an original real (imaginary) part. The array element complex excitation as the label is normalized to be randomly distributed in the unit circle on the complex plane, a region closer to the origin is more sensitive to the error, while other regions are relatively insensitive. Therefore, based on this principle, the use of the nonlinear mapping amplifies the real part and the imaginary part. The smaller the absolute value, the larger the mapping value. The effect achieved is to push the labeled sample points away from the error-sensitive region, thus reducing the prediction error.

S3.3: a phased array calibration model is obtained by inputting the training dataset with the label into the network for training until the network converges to the optimal state.

In some embodiments, the processor may obtain an initial calibration model from the cloud server based on the phased array features of the phased array to be calibrated; and train the initial calibration model based on the training dataset to obtain the calibration model. More descriptions of the phased array features may be found in the previous description related to step S1.

The cloud server is a virtual server running on a cloud computing platform. The server may be used to manage resources and process data and/or information from at least one component of the system or an external data source (e.g., a cloud data center). In some embodiments, the cloud server may be implemented on a cloud platform or provided virtually.

The initial calibration model is a pre-trained initial calibration model saved in the cloud server. The processor trains the initial calibration model based on the training dataset to obtain the calibration model that is ultimately used for phased array calibration.

In some embodiments, determining the initial calibration model includes: setting different neural network structure parameters by the cloud server for the phased array features of the different phased arrays to be calibrated; constructing a plurality of CNN-LSTM neural network models based on the neural network structure parameters; training the plurality of CNN-LSTM neural network models with terminal usage data to obtain the initial calibration model.

The neural network structure parameters are parameters that need to be pre-set when building a neural network model and are related to the neural network structure itself. For example, the neural network structure parameters may include the number of layers, the width of each layer, the input size, the convolution kernel, the convolution step, or the like.

In some embodiments, the neural network structure parameters may be preset by the technician. For example, the technician may set a preset value of a correlation sub-parameter for each sub-feature of the phased array feature; the cloud server may, based on values of different sub-features of the phased array feature in the terminal processing device, select a preset value of a corresponding correlation sub-parameter, thereby composing a complete neural network structure parameter.

The sub-feature is one or more specific features subdivided within the phased array feature. For example, the sub-feature includes one or more of the number of array elements, the type of array elements, the type of array, or the like.

The correlation sub-parameter is a parameter adjusted for changes in the phased array sub-features. For example, if the number of array elements in the sub-feature is increased, the number of layers in the neural network structure parameter needs to be increased as well to ensure calibration of the model. The number of layers is the correlation sub-parameter associated with the sub-feature of the number of array elements.

Some embodiments of the present disclosure disclose determining neural network structure parameters in a combinatorial manner, which allows the neural network structure parameters to be applied to multiple types of phased arrays.

In some embodiments, the processor may determine feature groupings based on existing phased array features; and set corresponding neural network structure parameters for the feature groupings.

The feature groupings are groupings obtained by dividing the existing phased array features.

In some embodiments, the cloud server may determine the feature groupings in multiple ways. For example, the cloud server may categorize sub-features by clustering algorithms (e.g., K-means algorithm) or interval methods to form multiple feature groupings.

As an example only, the cloud server may group each sub-feature in the phased array feature at a spacing predetermined by the technician. For example, the number of array elements of 10-20 and an array element type A are divided into a group; the number of array elements of 10-20 and an array element type B are divided into a group; the number of array elements of 20-30 and the array element type A are divided into a group; the number of array elements of 20-30 and the type of array element B are divided into a group, and so on.

In some embodiments, the processor may take an average value of the correlation sub-parameters corresponding to all phased array features of the feature grouping as the value of the correlation sub-parameter of the entire feature grouping, and the correlation sub-parameters of the plurality of sub-features i.e., the correlation sub-parameters of the plurality of sub-features form the complete neural network structure parameters.

In some embodiments of the present disclosure, the cloud server realizes broad applicability to various phased array types by grouping phased array features of different phased arrays to be calibrated and setting different neural network structure parameters, saving the computing resources required for neural network training.

In some embodiments, the cloud server may obtain the initial calibration model by training the plurality of CNN-LSTM neural network models with terminal usage data.

The terminal usage data refers to data that the terminal processing device calibrates according to the trained calibration model. The terminal usage data also corresponds to the inputs and outputs of the calibration model. It should be noted that the terminal usage data used for model training may be the terminal usage data after removing the anomalous data. For example, in response to the data after calibration being the anomalous data, the processor may flag the anomalous data and feed it back to the cloud server, which removes the anomalous data and then constructs the training data to train the CNN-LSTM neural network model to obtain the initial calibration model.

In some embodiments, the terminal usage data may be obtained in multiple ways. For example, the processor obtains the terminal usage data by uploading data generated by the respective terminal processing device during actual use.

In some embodiments, the cloud server may initially train the constructed CNN-LSTM neural network model based on the terminal usage data uploaded by the terminals to obtain a generalized initial calibration model. The initial calibration model is trained in a manner similar to that of the calibration model, which may be described in related descriptions of the step S3. It should be noted that the training dataset of the initial calibration model includes multiple terminal usage data. From the foregoing, data in the terminal usage data before calibration is the training sample of the initial calibration model, and data in the terminal usage data after calibration is the training label of the initial calibration model.

In some embodiments, the processor may train the initial calibration model based on the training dataset to obtain the calibration model. More descriptions of the training dataset and acquisition may be found in the previous descriptions of step S2.

In some embodiments, the inputs to the calibration model further include a sequence of interference features in the environment in which the phased array to be calibrated.

The sequence of interference features is a sequence consisting of interference features at multiple points in time. In some embodiments, the processor may construct the sequence of interference features based on the plurality of collected interference features.

The interference features are information about an interference source in the environment that interferes with the propagation of the measured RF, millimeter wave signals, etc. For example, the interference features may include: building information (location and/or height of surrounding buildings), vegetation information (density and/or height of surrounding vegetation), meteorological information (rain, snow, fog, etc.), or the like. In some embodiments, the interference features may be obtained based on the terminal processing device being captured by an environmental monitoring device.

The terminal processing device is a hardware device that performs data processing and control at the site of use or application end of the phased array system. For example, the terminal processing device may include a mobile device, an industrial control system, an embedded system, or the like.

The environmental monitoring device is a device used to monitor and record environmental conditions. For example, the environmental device may include an acoustic detector, which is used to measure the intensity and frequency of acoustic waves; an optical sensor, which is used to monitor light intensity, ultraviolet index, and other optical conditions; and a radio frequency identification (RFID) identifier, which is used to track and monitor the location and status of objects; and weather stations for monitoring temperature, humidity, wind speed, precipitation, and other meteorological conditions. Since the building information and vegetation information are relatively stable, there is no need to monitor them in real time; the processor may just monitor the weather information in real time.

It should be noted that when the inputs of the calibration model include the sequence of interference features, the sequence of interference features need to be included in the training samples during both an initial training (the cloud server training) and a secondary training (terminal server training).

In some embodiments, an acquisition frequency of the interference feature may be determined based on the number of array elements in the phased array feature, and an average frequency of the measured data after correction processing.

The acquisition frequency is a frequency at which interference features are sampled per unit of time.

The measured data after correction processing is the measured data after the correction processing. More descriptions of the correction processing may be found in the related description of the preceding step S1.

The average frequency refers to an average frequency of the measured data after correction processing, and the average frequency may be expressed by the amount of measured data after correction processing per unit time.

In some embodiments, the cloud server may determine the acquisition frequency based on the number of array elements in the phased array feature and the average frequency of the measured data after correction processing. In some embodiments, the number of array elements in the phased array feature is positively correlated to the acquisition frequency. For example, the higher the number of array elements in the phased array, the higher the system complexity, i.e., more frequent acquisitions are required to capture the dynamics of each array element to increase the accuracy of the calibration.

In some embodiments of the present disclosure, the average frequency of the measured data after correction processing is also positively correlated to the acquisition frequency. For example, the higher the average frequency of the measured data, the more susceptible the signal is to interference from environmental interference sources, and a more detailed interference signature needs to be captured to calibrate.

It should be noted that in response to the inconsistency of the acquisition frequency, the sequence of interference features with low acquisition frequency may be interpolated to make up for the low acquisition frequency in order to ensure uniformity of the model input format. For example, if the first acquisition frequency acquires 10 pieces of data and the second acquisition frequency acquires 5 pieces of data at the same time, a uniform difference is made in the middle of the 5 pieces of data corresponding to the second acquisition frequency so as to reach 10 pieces of data. The difference may be the same as any of the two actual values before and after, or the average of the two actual values before and after is taken.

In some embodiments of the present disclosure, by considering the number of array elements and the averaged frequency of the measured data, the interference features in the environment can be captured more accurately to improve the calibration accuracy of the phased array system.

In some embodiments of the present disclosure, taking into account interference features in the environment, the calibration model can more accurately compensate for phase and amplitude errors induced by external factors, improving the performance and reliability of the phased array system in a variable environment.

In some embodiments of the present disclosure, a plurality of calibration models applicable to various types of phased arrays are constructed and trained through a cloud server utilizing a variety of neural network structural parameters, and such cloud and terminal collaborative calibration process not only improves the efficiency and accuracy of calibration, but also enhances the model's adaptability to different environments and generalization capability, while reducing the computational burden on the terminal devices and accelerating the integration and deployment of new phased array types.

S4: a phased array to be calibrated is measured, acquired measured data is preprocessed, and the acquired measured data is input into the calibration model to obtain a calibration result.

The phased array to be calibrated refers to the phased array that needs to be calibrated. The measured data refers to data obtained from the matching measurement of the phased array to be calibrated. The measurement means a measurement of the phased array to be measured by a phase setting matrix. Preprocessing of the measured data refers to processing the measured data into a sequence of inputs to the calibration model, and more may be found in the related descriptions of steps S4.1-S4.2.

In some embodiments, the step S4 may include steps S4.1-S4.2 as follows:

S4.1: 2N+1 measurements are performed on the phased array to be measured according to the phase setting matrix S described in the S1.3 in a microwave anechoic chamber, and an amplitude of a parameter measured by a network analyzer after each phase setting is converted as follows:

$$f(x) = 10^{(\frac{x}{10})} \tag{15}$$

Finally, a data sequence with a length of 2N+1 is obtained, which is represented by a one-dimensional matrix $P=[P_1, P_2, \ldots, P_{2N+1}]$.

The phased array to be measured refers to a phased array that requires measurements. In some embodiments, the measurements may be performed by a network analyzer. In the one-dimensional matrix, $P_1, P_2, \ldots, P_{2N+1}$ are the first, second, . . . , and 2N+1th measurements obtained by transforming the parameter magnitude by formula (15).

Figure 2:
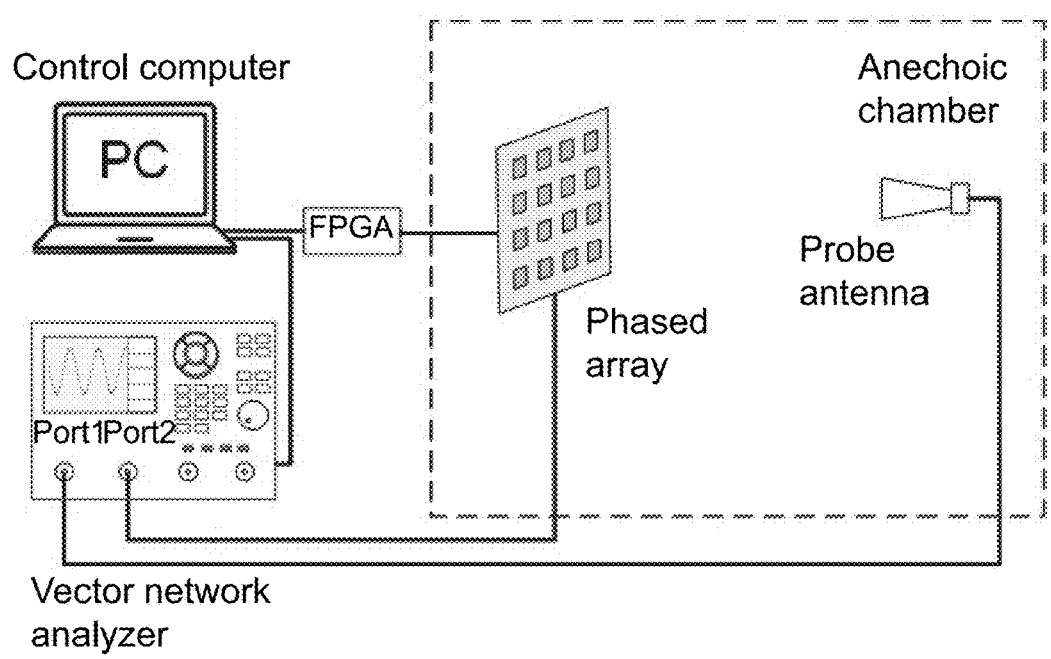
FIG. 2 is a schematic diagram illustrating an exemplary test system for a process for phased array calibration based on CNN-LSTM using power measurement and a relationship between a phased array and a probe according to some embodiments of the present disclosure.

FIG. 2 is a schematic diagram illustrating an exemplary test system for a process for phased array calibration based on CNN-LSTM using power measurement and a relationship between a phased array and a probe according to some embodiments of the present disclosure. FIG. 2 describes a core instrumentation and components needed to implement the method, and also describes the position of the probe relative to the phased array to be tested during the measurement. As shown in FIG. 2, the probe antenna is placed in front of the phased array to be measured under the control of the control computer in the microwave anechoic chamber, and the amplitude phase of the phased array to be measured is measured by the vector network analyzer.

S4.2: the one-dimensional matrix P with a maximum element is normalized:

$$X = \frac{P}{\max(P)} \tag{16}$$

Wherein $\max[\cdot](\cdot)$ denotes taking a maximum value of the matrix and inputting the sequence X into the calibration model obtained from training in the S3.2, and an output of the calibration model is the calibration result.

Some embodiments of the present disclosure, for phased arrays with a number of array elements of N, calibration can be accomplished with only 2N+1 number of power measurements, and the number of measurements required is much lower than that of traditional power measurement class calibration methods, and the calibration efficiency relative to traditional algorithms has been substantially improved.

Figure 5:
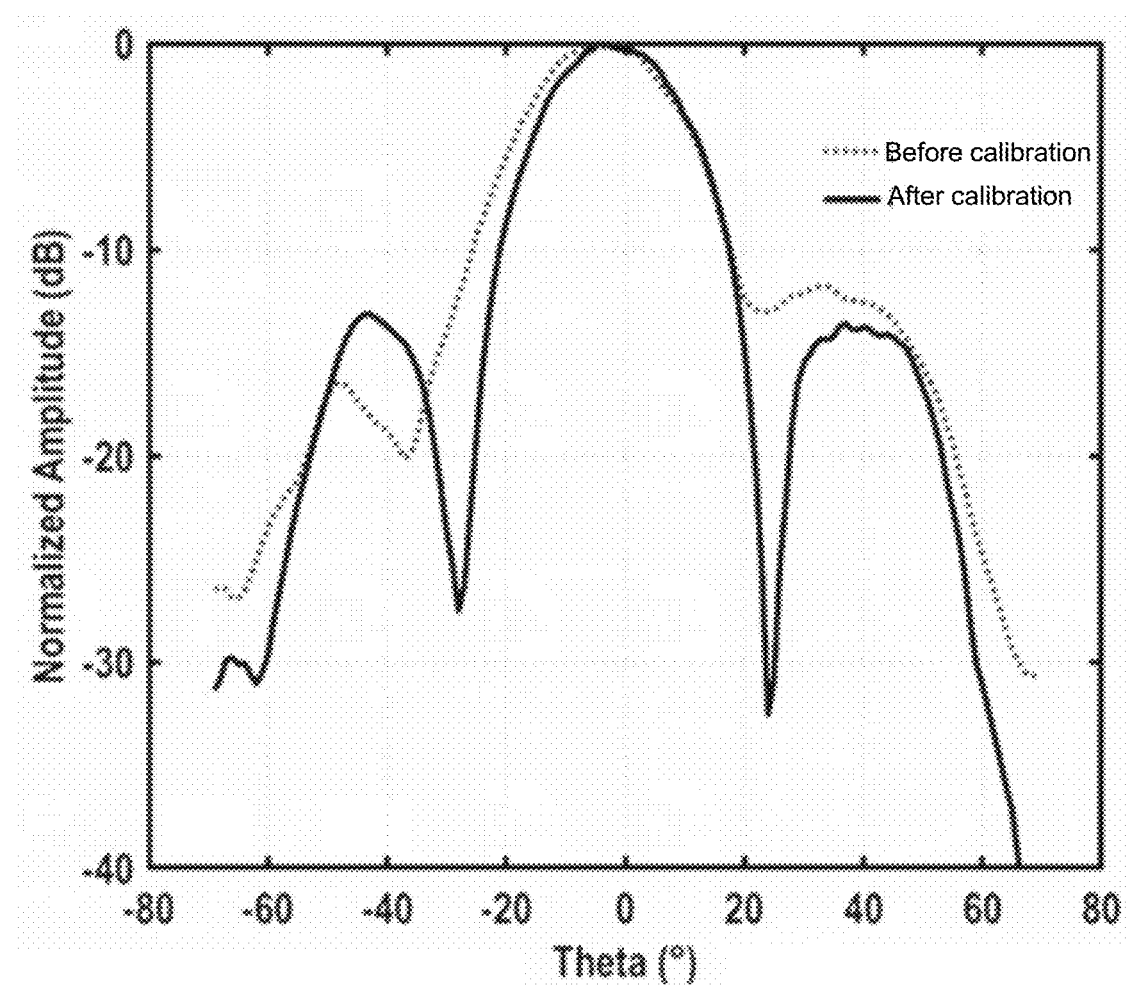
FIG. 5 is a schematic diagram illustrating a comparison of far-field radiation pattern before and after calibration of a Ku-band phased array with a size of 4*4 based on a process for phased array calibration based on CNN-LSTM using power measurement according to some embodiments of the present disclosure.

FIG. 5 is a schematic diagram illustrating a comparison of far-field radiation patterns before and after calibration of a Ku-band phased array with a size of 4*4 based on a process for phased array calibration based on CNN-LSTM using power measurement according to some embodiments of the present disclosure. As shown in FIG. 5, the horizontal axis indicates the angle and the vertical axis indicates the radiation intensity. FIG. 5 demonstrates the calibration effect of the phased array calibration method based on CNN-LSTM employing power measurements on a 2D surface array, with significant reduction of the side lobe of the radiation pattern, narrowing of the width of the main lobe, and deepening of the null after calibration.

Figure 6:
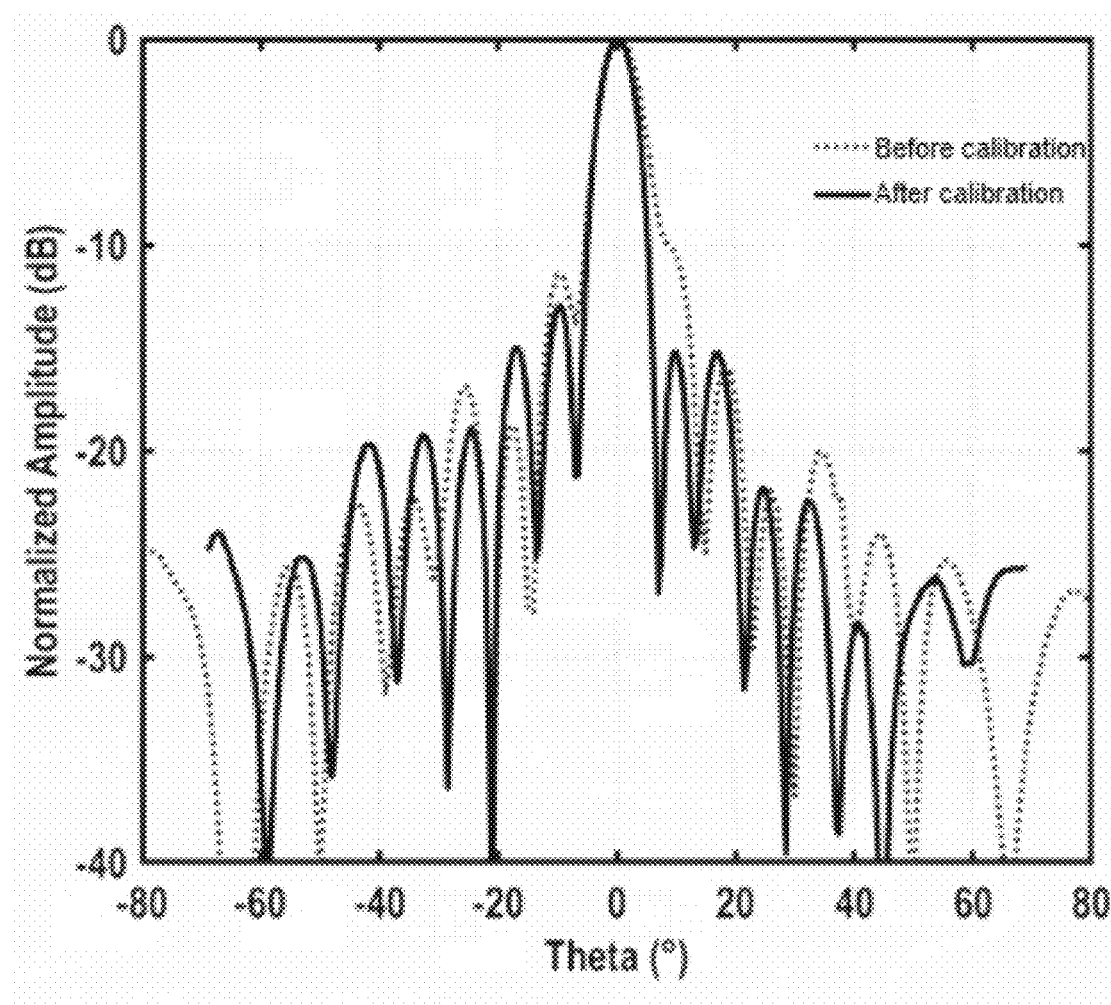
FIG. 6 is a schematic diagram illustrating a comparison of far-field radiation pattern before and after calibration of a K-band linear phased array with a size of 16*1 based on a process for phased array calibration based on CNN-LSTM using power measurement according to some embodiments of the present disclosure.

FIG. 6 is a schematic diagram illustrating a comparison of far-field radiation patterns before and after calibration of a K-band linear phased array with a size of 16*1 based on a process for phased array calibration based on CNN-LSTM using power measurement according to some embodiments of the present disclosure. As shown in FIG. 6, the horizontal axis indicates the angle and the vertical axis indicates the radiation intensity. FIG. 6 demonstrates the calibration effect of the phased array calibration method based on CNN-LSTM employing power measurements for a line array, with significant reduction of the side lobe of the radiation pattern, narrowing of the width of the main lobe, and deepening of the null after calibration.

Some embodiments of the present disclosure provide a method for phased array calibration based on CNN-LSTM using power measurement, with high calibration efficiency, the number of measurements required is much lower than all current power-only calibration methods, for phased arrays with N array elements, only 2N+1 power measurements are required to complete the calibration; low requirements for measurement equipment, with power measurement instruments can implement the method; online calibration is supported, for phased arrays in practical applications, without disassembling them. At the same time, compared to other neural network-based calibration methods, the proposed method of the present invention has stronger ease of use and versatility, the training data does not need to be collected in the field measurements, a large amount of training data can be conveniently obtained by using the method provided by the present disclosure, and a single training can be used to calibrate the number of elements of the array of the same N of any frequency arrays, arbitrary forms of arrays (line arrays, surface arrays, round arrays, heteromorphic row arrays, commonality arrays or the like), without the need to train the network model for phased arrays with different operating frequencies and forms.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. Such as "an embodiment," "an embodiment," and/or "some embodiment" means a feature, structure, or characteristic associated with at least one embodiment of the present disclosure. Accordingly, it should be emphasized and noted that two or more references in the present disclosure, at different locations, to "one embodiment" or "an embodiment" or "an alternative embodiment" in different places in the present disclosure do not necessarily refer to the same embodiment. In addition, certain features, structures, or characteristics in one or more embodiments of the present disclosure may be suitably combined.

Furthermore, unless expressly stated in the claims, the order of the processing elements and sequences described herein, the use of numerical letters, or the use of other names are not intended to qualify the order of the processes and laminar flow hoods described herein. While some embodiments of the invention that are currently considered useful are discussed in the foregoing disclosure by way of various examples, it is to be understood that such details serve only illustrative purposes and that additional claims are not limited to the disclosed embodiments; rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or a description thereof. However, this method of disclosure does not imply that the objects of the present disclosure require more features than those mentioned in the claims. Rather, claimed subject matter may lie in less than all features of a single foregoing disclosed embodiment.

Some embodiments use numbers describing the number of components, attributes, and it should be understood that such numbers used in the description of embodiments are modified in some examples by the modifiers "approximately," "nearly," or "substantially." Unless otherwise noted, the terms "about," "approximately," or "approximately" indicate that a ±20% variation in the stated number is allowed. Correspondingly, in some embodiments, the numerical parameters used in the specification and claims are approximations, which approximations are subject to change depending on the desired characteristics of individual embodiments. In some embodiments, the numerical parameters should take into account the specified number of valid digits and use a general digit retention method. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in this present disclosure, such as articles, books, specification sheets, publications, documents, etc., the entire contents of which are hereby incorporated herein by reference. Application history documents that are inconsistent with or conflict with the contents of this present disclosure are excluded, as are documents (currently or hereafter appended to this present disclosure) that limit the broadest scope of the claims of this present disclosure. It should be noted that to the extent that there is an inconsistency or conflict between the descriptions, definitions, and/or use of terms in the materials appurtenant to this present disclosure and those set forth herein, the descriptions, definitions and/or use of terms in this present disclosure shall prevail.

Finally, it should be understood that the embodiments described herein are only used to illustrate the principles of the embodiments of this present disclosure. Other deformations may also fall within the scope of this present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A phased array automatic calibration device based on convolutional neural network-long short-term memory (CNN-LSTM) using power measurement, comprising: at least one processor; and a memory communicatively coupled to the at least one processor, wherein the memory stores program instructions executable by the at least one processor, and the processor is configured to:

S1: model a phased array based on an array signal theory, set a amplitude and phase for each channel randomly by program within an amplitude-phase error range, calculate and store corresponding array radiated field data, repeat above operations to generate phased array signal data with amplitude-phase error information that meets a preset quantity condition;

S2: preprocess the phased array signal data to obtain a training dataset;

S3: obtain a calibration model by building a CNN-LSTM neural network model and input training data containing a label into a network for training until the network is in a state of convergence; or obtain an initial calibration model from a cloud server, the initial calibration model being obtained by training a CNN-LSTM neural network model constructed based on neural network structure parameters by the cloud server; the neural network structure parameters being obtained base on feature groupings of a phased array to be calibrated;

S4: control an array elements of the phased array to be calibrated to shift phase;

measure the phased array to be calibrated, preprocess acquired measured data, and input the acquired measured data into the calibration model to obtain a calibration result;

wherein an input of the calibration model further includes a sequence of interference features in an environment in which the phased array to be calibrated is, wherein the interference features are obtained based on a terminal processing device being captured by an environmental monitoring device; and the processor is further configured to:

determine an acquisition frequency of the interference features based on a number of array elements in a phased array feature, and an average frequency of measured data after correction processing;

control the environmental monitoring device to obtain the interference features based on the acquisition frequency;

wherein the S3 is accomplished by following sub-steps:

S3.1: building the CNN-LSTM neural network model;

S3.2: designing a loss function for training the CNN-LSTM neural network model;

S3.3: obtaining a phased array calibration model by inputting the training dataset with the label into the network for training until the network is in the state of convergence;

the S3.1 is accomplished by following sub-steps:

S3.1.1: the CNN-LSTM neural network including a Convolutional Neural Network (CNN), a Long Short-Term Memory (LSTM), and a complex fully connected network, wherein the CNN is configured to adaptively extract spatial feature information from input sequence data, and the LSTM is configured to utilize spatial features extracted by the CNN and combine temporal information of the sequence data for automatic modeling, and output a final prediction result by using the complex fully connected network immediately after the LSTM;

the S3.2 is accomplished by following sub-steps:

S3.2.1: calculating mean square errors for both the real and imaginary parts, respectively, and adding the two mean square errors as the loss function, the loss function is denoted as:

$$\text{Loss} = \frac{1}{n}\sum_{i=1}^{n}(\Re(\hat{y}_i) - \Re(y_i))^2 + \frac{1}{n}\sum_{i=1}^{n}(\Im(\hat{y}_i) - \Im(y_i))^2 \quad (1)$$

wherein; and $\hat{y}_i$ denote $y_i$ predicted value and a true value, respectively, $\Re(\cdot)$ denotes obtaining a complex real part, and $\Im(\cdot)$ denotes obtaining a complex imaginary part;

the S1 is accomplished by following sub-steps:

S1.1: establishing a phased array signal model; setting antenna to be measured as a two-dimensional planar phased array of size $N_x \times N_y$, arranged in a rectangle, describing a spatial orientation in terms of a pitch angle and an azimuth angle, and when phased array beam to be measured is directed to $(\theta_s, \phi_s)$, a radiated electric field of the phased array in a measurement orientation $(\theta, \phi)$ being expressed as:

$$E(\theta, \phi) = \sum_{n=1}^{N_x}\sum_{m=1}^{N_y} G_{n,m}(\theta, \phi) I_{n,m} e^{jksin\theta(nd_x\cos\phi + md_y\sin\phi)} \quad (2)$$

wherein $k=2\pi/\lambda$, $\lambda$ is wavelength $d_x$ and $d_y$ denote a row spacing and column spacing of array element, respectively, m and n denote a row and column number of the array element, respectively, $G_{n,m}(\theta,\phi)$ and $I_{n,m}$ denote a normalized independent directivity coefficient and a complex excitation including an amplitude-phase error of array element (m, n), respectively, and $I_{n,m}$ is denoted as:

$$I_{n,m} = a_{n,m}e^{j\delta_{n,m}} \cdot e^{-jksin(\theta_s)(nd_x\cos(\phi_s) + md_y\sin(\phi_s))} \quad (3)$$

wherein $\alpha_{n,m}$ is a relative amplitude of initial complex excitation of the array element (m, n), a theoretical range of $\alpha_{n,m}$ is 0 to 1, and $\delta_{n,m}$ denotes a phase of the initial complex excitation of the array element (m, n), a theoretical range of $\delta_{n,m}$ is $-180°$ to $+180°$, data for training the model is generated based on signal models described in formula (2) and formula (3);

S1.2: taking $(\theta_s, \phi_s) = (0,0)$ for beam pointing and $(0, \phi) = (0,0)$ for observation orientation, making measured array beam pointing in a normal direction, and placing a probe antenna in the normal direction for measuring, wherein measured value is $E(0,0)$, making $G_{n,m}(\theta, \phi)=1$, substituting $(\theta_s, \phi)=(0,0)$ and $(\theta,\phi)=(0,0)$ according to the formula (2) and (3) to obtain:

$$E(0, 0) = \sum_{n=1}^{N_x}\sum_{m=1}^{N_y} a_{n,m}e^{j\delta_{n,m}} \quad (4)$$

wherein the formula (4) is $N_x \times N_y$ cumulative form, there is no sequential relationship among the items, and the items of the formula (4) are rearranged and rewritten to obtain:

$$E(0, 0) = \sum_{n=1}^{N_x}\sum_{m=1}^{N_y} a_{n,m}e^{j\delta_{n,m}} = \sum_{l=1}^{N_x \times N_y} a_l e^{j\delta_l} = \sum_{l=1}^{N} a_l e^{j\delta_l} \quad (5)$$

wherein $N=N_x \times N_y$ denotes a total number of array elements, and the formula (5) is written in matrix form as:

$$E(0, 0) = SQ = [e^{j0}, e^{j0}, \ldots, e^{j0}]_{1 \times N} \begin{bmatrix} a_1 e^{j\delta_1} \\ a_2 e^{j\delta_2} \\ \vdots \\ a_N e^{j\delta_N} \end{bmatrix}_{N \times 1} \quad (6)$$

wherein Q denotes an array initial complex excitation matrix containing error components, and S denotes a phase setting matrix of measurement, a count of columns of the phase setting matrix are equal to a count of array elements N and the count of rows is determined by a count of measurements, each row describes a phase shift value of each array element in a single measurement, elements of S are continuously changed during a calibration process, simultaneously measuring and recording corresponding $E(0,0)$ to obtain a data sequence, and estimating the array initial complex excitation matrix Q based on the data sequence;

S1.3: solving the array initial complex excitation matrix Q by performing $2N+1$ measurements, wherein all array elements are kept in an initial state without phase shifting for a first measurement, and after which each array element is sequentially phase shifted by $90°$ and $180°$ for measurement, wherein the $2N+1$ measurements corresponding to the phase setting matrix S is expressed as:

$$S = \begin{bmatrix} s_{1,1} & s_{1,2} & \cdots & s_{1,N} \\ s_{2,1} & s_{2,2} & \cdots & s_{2,N} \\ s_{3,1} & s_{3,2} & \cdots & s_{3,N} \\ \vdots & \vdots & \ddots & \vdots \\ s_{2N,1} & s_{2N,2} & \cdots & s_{2N,N} \\ s_{(2N+1),1} & s_{(2N+1),2} & \cdots & s_{(2N+1),N} \end{bmatrix} = \begin{bmatrix} e^{j0} & e^{j0} & \cdots & e^{j0} \\ e^{j\frac{\pi}{2}} & e^{j0} & \cdots & e^{j0} \\ e^{j\pi} & e^{j0} & \cdots & e^{j0} \\ \vdots & \vdots & \ddots & \vdots \\ e^{j0} & e^{j0} & \cdots & e^{j\frac{\pi}{2}} \\ e^{j0} & e^{j0} & \cdots & e^{j\pi} \end{bmatrix} \quad (7)$$

wherein when generating the training data by simulating measurements with the program, each element of the array initial complex excitation matrix Q in the formula (6) is randomly generated in accordance with a preset error range, a amplitude of each element ranges from 0.1 to 1, and a phase of each element ranges from $-180°$ to $+180°$, and after generating a set of initial excitations randomly each time to obtain the array initial complex excitation matrix Q substituting the phase setting matrix S and the array initial complex excitation matrix Q into the formula (6) to calculate an electric field vector sequence with a length of $2N+1$, and representing the sequence by a matrix E of size $(2N+1)\times1$:

$$E = SQ = [E(0,0)_1, E(0,0)_2, \ldots, E(0,0)_{2N+1}] = [E_1, E_2, \ldots, E_{2N+1}] \quad (8)$$

wherein each element $E_i = E_i = (0,0)_i$, $i = 0, 1, \ldots, 2N+1$ represents a radiation electric field vector measured by phase-shifting the phased array according to i-th row of the phase alignment matrix S;

S1.4: randomly generating the array initial complex excitation matrix Q calculating the electric field vector sequence E by substituting the array initial complex excitation matrix Q and the phase setting matrix S in the formula (7) into the formula (6), and saving the array initial complex excitation matrix Q and the electric field vector sequence E one by one corresponding to each other, and repeating the S1.4 until generated data meets a training requirement, and completing acquisition of raw data.

2. A non-transitory computer-readable storage medium, wherein the computer-readable storage medium stores program instructions, and the program instructions are configured to be executed by a computer to implement a process implemented by the processor of claim 1.

3. The phased array automatic calibration device of claim 1, wherein the processor is further configured to:
S2.1: converte the electric field vector sequence E into a power value sequence P:

$$P = [P_1, P_2, \ldots, P_{2N+1}] = [|E_1|^2, |E_2|^2, \ldots |E_{2N+1}|^2] \quad (9)$$

obtain a real number sequence X by normalizing the power value sequence P with a maximum element value of the power value sequence P, and use the real number sequence X as an input feature of the neural network:

$$X = \frac{P}{\max(P)} \quad (10)$$

wherein max (·) denotes taking a maximum value of matrix;

S2.2: normalize the array initial complex excitation matrix Q with an electric field vector $E_1$ in an initial state, wherein a normalization result is denoted as $\overline{Q}$:

$$\overline{Q} = \frac{Q}{E_1} = \begin{bmatrix} \frac{a_1}{|E_1|} e^{j(\delta_1 - \angle E_1)} \\ \frac{a_2}{|E_1|} e^{j(\delta_2 - \angle E_1)} \\ \vdots \\ \frac{a_N}{|E_1|} e^{j(\delta_N - \angle E_1)} \end{bmatrix}_{N \times 1} \quad (11)$$

wherein $|E_1|$ and $\angle E_1$ denote a amplitude and phase of the electric field vector $E_1$, respectively;

obtain complex sequence Y by transforming the normalized array initial complex excitation matrix $\overline{Q}$ into a corresponding power form, retain phase information, and further normalize the normalized array initial complex excitation matrix $\overline{Q}$ with the maximum value of its power form, and use the complex sequence Y as a label for the training data:

$$Y = \frac{|\overline{Q}| \odot \overline{Q}}{\max(|\overline{Q}| \odot |\overline{Q}|)} \quad (12)$$

wherein |·| denotes taking modulus of a complex matrix element by element, the result is still a matrix, $\odot$ denotes Hadamard product, and max (·) denotes taking a maximum value of the matrix; and S2.3: convert the electric field vector sequence E and the array initial complex excitation matrix Q generated by the S2.1 and S2.2 into a corresponding feature sequence X and label sequence Y and save the feature sequence X and label sequence Y to complete production of the training dataset.

4. The phased array automatic calibration device of claim 1, wherein the processor is further configured to:
nonlinearly map the real part and the imaginary part before calculating the mean square errors, the nonlinearly mapping be expressed as:

$$f(x) = \frac{1 - e^{(-1024x)}}{1 + e^{(-1024x)}} \sqrt{|x + \epsilon|}, \epsilon = 10^{-6} \quad (13)$$

wherein $\epsilon$ is a hyperparameter with an extremely small numerical value for robustness enhancement, a value of the hyperparameter is $10^{-6}$, and a loss function after applying the nonlinearly mapped is finally expressed as:

$$\text{Loss} = \frac{1}{n} \sum_{i=1}^{n} (f(\Re(\hat{y}_i)) - f(\Re(y_i)))^2 + \frac{1}{n} \sum_{i=1}^{n} (f(\Im(\hat{y}_i)) - f(\Im(y_i)))^2. \quad (14)$$

5. The phased array automatic calibration device of claim 1, wherein the processor is further configured to:
S4.1: control the array elements of the phased array to be calibrated to shift phase according to the phase setting matrix S described in the S1.3;

instruct a control computer in a microwave anechoic chamber to place a probe antenna in front of the phased array to be measured;

control the probe antenna to perform 2N+1 measurements on the phased array to be measured, and convert an amplitude of a parameter measured by a network analyzer after each phase setting as follows:

$$f(x) = 10^{(\frac{x}{10})} \quad (15)$$

obtain a data sequence with a length of 2N+1, which is represented by a one-dimensional matrix P= [$P_1$, $P_2$, ..., $P_{2N+1}$];

S4.2: normalize the P with a maximum element:

$$X = \frac{P}{\max(P)} \quad (16)$$

wherein max (·) denotes taking a maximum value of the matrix and inputting the sequence X into the calibration model obtained from training in the S3.2, and an output of the calibration model is the calibration result.

6. The phased array automatic calibration device of claim 1, wherein the processor is further configured to:

obtain a historical error data corresponding to the phased array feature;

determine a target error distribution corresponding to the phased array feature based on the historical error data; and set the amplitude and the phase based on the target error distribution and the amplitude-phase error range.

7. The phased array automatic calibration device of claim 6, wherein the processor is further configured to:

correct the historical error data by a preset algorithm; and determine the target error distribution based on the historical error data after the correction process, wherein the preset algorithm includes:

S211, arbitrarily selecting an error feature as a slicing feature from two error features in the historical error data;

S212, based on any one of slicing points in the slicing feature, slicing a sample set to obtain sample sub-sets, sample set is determined based on the historical error data;

S213, in response to a sample sub-set not satisfying a first preset condition, designating the sample sub-set that does not satisfy the first preset condition as a new sample set, and repeating steps S211 and S212, and slicing the new sample set to obtain a new sample sub-set;

in response to a sample sub-set satisfying the first preset condition, obtaining slicing sub-parameters for this round of slicing and performing S214;

S214, in response to a sample sub-set not satisfying a second preset condition, repeating steps S211-S213 based on an initial sample set to determine new slicing sub-parameters;

in response to a sample sub-set satisfying the second preset condition, stopping the slicing and determining the slicing parameters based on the slicing sub-parameters;

S215, performing the correction process for the historical error data based on the slicing parameters.

8. The phased array automatic calibration device of claim 7, wherein the processor is further configured to:

determine a sampling rate based on a variance of the historical error data;

randomly select data from the historical error data to construct the sample set based on the sampling rate.

\* \* \* \* \*